(No Model.)
J. M. HERMAN.
DEVICE FOR OPERATING WHIPS.
No. 570,800.  Patented Nov. 3, 1896.
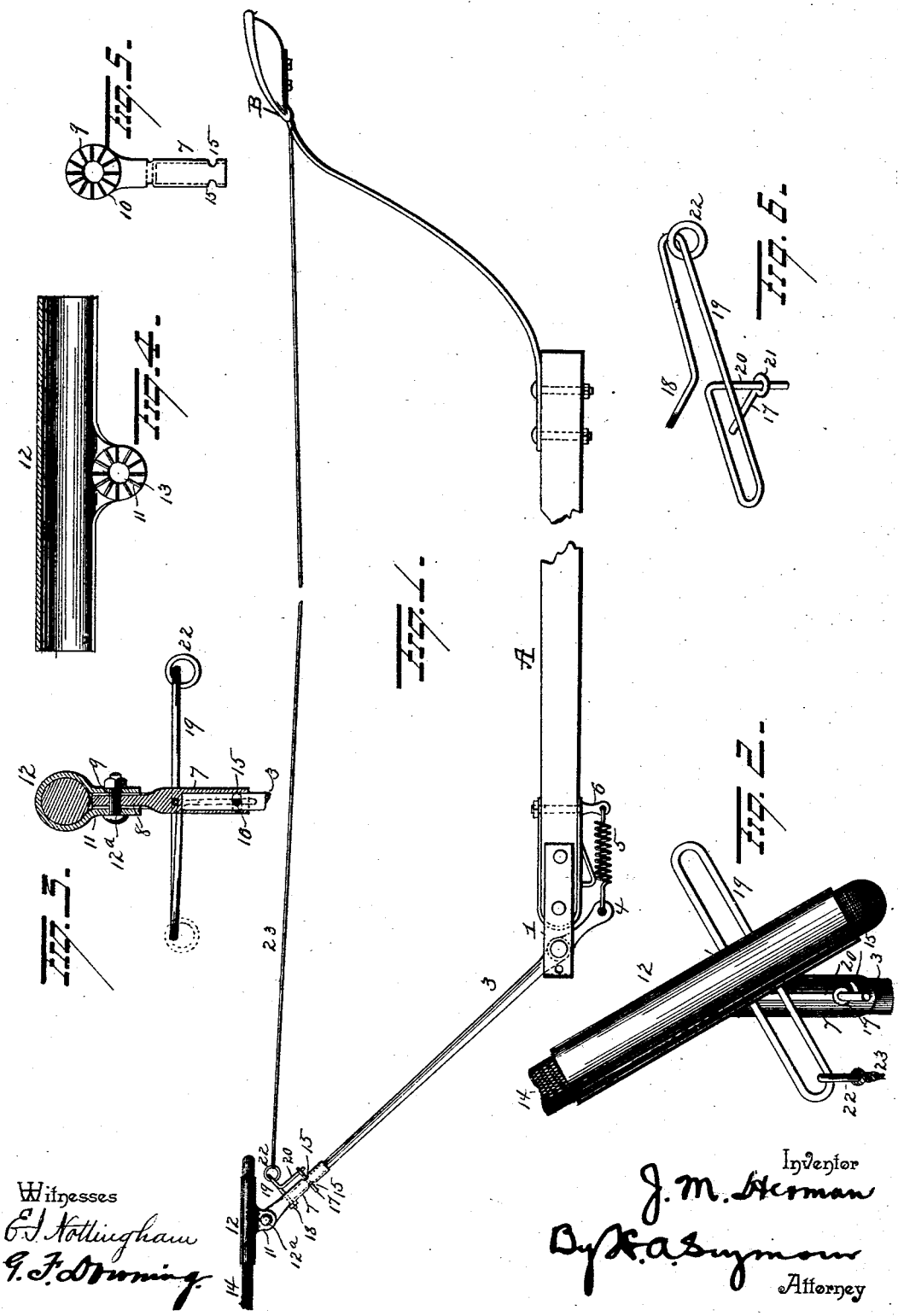
Witnesses
E. J. Nottingham
G. F. Downing
Inventor
J. M. Herman
By H. A. Seymour
Attorney

UNITED STATES PATENT OFFICE.

JOHN M. HERMAN, OF SCOTIA, NEBRASKA.

DEVICE FOR OPERATING WHIPS.

SPECIFICATION forming part of Letters Patent No. 570,800, dated November 3, 1896.

Application filed March 2, 1896. Serial No. 581,495. (No model.)

*To all whom it may concern:*

Be it known that I, JOHN M. HERMAN, a resident of Scotia, in the county of Greeley and State of Nebraska, have invented certain new and useful Improvements in Devices for Operating Whips; and I do hereby declare the following to be a full, clear, and exact description of the invention, such as will enable others skilled in the art to which it appertains to make and use the same.

My invention relates to an improvement in devices for operating whips, the object of the invention being to provide simple and efficient means whereby the driver of a vehicle can readily operate a whip to strike the forward or lead horses of a team.

With this object in view the invention consists in certain novel features of construction and combinations and arrangements of parts, as hereinafter set forth, and pointed out in the claims.

In the accompanying drawings, Figure 1 is a view illustrating an embodiment of my invention. Figs. 2, 3, 4, 5, and 6 are detail views.

A represents a tongue or pole of a vehicle, and B a driver's seat secured to the rear end thereof. To the forward end of the tongue A a forwardly-projecting arm 1 is secured and made with a hole near its free end for the attachment of the whiffletree to which the lead horses of the team are attached. The arm 1 is preferably made by bending a bar of metal upon itself, the free ends being secured to the tongue by means of bolts passing through them and transversely through the tongue. A pole or rod 3 (preferably tubular in form) is disposed between the members of the arm 1 and pivotally connected near its lower end thereto, the forward movement of said rod or pole being limited by engagement with the forward end of the arm 1 where the members thereof meet. The lower end of the pole or rod 3 (which terminates a short distance below the tongue) is made with an eye 4, to which one end of a coiled spring 5 is attached. The other end of said spring is attached to an eyebolt 6, secured to and depending from the tongue and serves to cause the upper end of the pole or rod 3 to project forwardly in an inclined direction and in engagement with the forward end of the arm 1, which latter acts as a stop for said pole or rod. A cap or sleeve 7 is placed loosely on the upper end of the pole or rod 3 and provided at its free end with a segment 8, having a transverse hole 9 and also having notches 10 in its faces. Ears 11, projecting from a whip socket or holder 12, embrace the segment 8, and through said ears and the transverse hole in said segment a bolt 12ª is passed and provided with a suitable nut. The ears 11 are provided on their inner faces with ribs or projections 13, adapted to enter the recesses or notches 10 in the segment 8, so as to retain the whip socket or holder in any position to which it may be adjusted. From this construction it will be seen that the whip-socket can be turned on its pivotal connection with the cap or sleeve 7, so as to dispose the whip 14 at any desired angle, and that it can be readily secured at any desired adjustment in the manner above explained.

The sleeve or cap 7 is made with holes 15 at diametrically opposite points and are adapted to aline with a hole 16 in the pole or rod 3, said hole 15 being somewhat larger than the holes 16, so that when a pin 17 is passed through said holes 15 16 the cap or sleeve will be prevented from escape from the pole or rod 3 and still permit the sleeve or cap to turn somewhat on said pole or rod. The cap or sleeve 7 is also perforated at a point beyond the free end of the pole or rod 3 for the reception of an arm 18, projecting from a transverse bar 19, the free end of said arm being screw-threaded for the reception of a suitable nut. The transverse bar 19 is also made with a depending arm 20, which passes loosely through an eye 21 at the free end of the pin 17. The transverse bar 19 and arms 18 20 may be conveniently made of a single rod bent to form a spring, as shown in Fig. 6. A ring 22 is placed on the transverse bar 19 and adapted to move from one end thereof to the other. A cord or rope 23 is attached at one end to the ring 22 and at the other end to the driver's seat.

Assume now that it is the driver's desire to strike the left-hand lead horse with the whip. The driver will pull the cord 23, which will cause the pole or rod 3 to turn on its fulcrum, and assuming the ring to be at the left-hand end of the transverse bar or loop 19 the cap or sleeve 7 will be made to turn slightly, so as to cause the whip to project over the left-hand lead horse. The driver will now release the cord 23 and the spring 5 will cause the free end of the pole or rod 3 to move forwardly with considerable force and the whip to strike the horse.

When the cord was pulled, as above explained, the effect was not only to cause the cap or sleeve 7 to turn on the rod 3, but also to cause the transverse bar or loop 19 to assume a diagonal position, and therefore when the cord is released the ring 22, to which it is attached, will slide along said transverse bar or loop to the other end thereof. Should the cord 23 be now again pulled, the effect would be to cause the free end of the pole or rod 3 to move rearwardly and the sleeve to turn so as to dispose the whip over the right-hand lead horse. The release of the cord would then cause the whip to strike the right-hand lead horse.

It is evident that by a slight lateral jerk on the cord the ring 22 can be made to move to one end or the other of the transverse bar or loop 19, so that either lead horse can be struck, as desired.

My improvements are simple in construction and effectual in all respects in the performance of their functions.

Various slight changes might be made in the details of construction of my invention without departing from the spirit thereof or limiting its scope, and hence I do not wish to limit myself to the precise details of construction herein set forth.

My improvements may be applied to the vehicle so that it can be operated to whip the hind horses, if desired.

Having fully described my invention, what I claim as new, and desire to secure by Letters Patent, is—

1. The combination with a vehicle-tongue, of a pole or rod pivotally connected thereto, means for projecting said pole or rod forwardly and a whip-holder attached to said pole or rod in such manner as to permit the whip carried by said holder to have a lateral movement axially relative to the rod, substantially as set forth.

2. The combination with a vehicle-tongue, of a pole or rod pivotally connected thereto, a spring for projecting the free end of said pole or rod forwardly, a sleeve axially swiveled to said pole or rod, a whip-holder attached to said sleeve, and means for simultaneously withdrawing said pole or rod and turning said sleeve, substantially as set forth.

3. The combination with a vehicle-tongue, of a pole or rod pivotally connected thereto, a spring for projecting the free end of said pole or rod forwardly, a sleeve carried by said pole or rod and adapted to turn axially a limited distance thereon, a whip-holder attached to said sleeve, and means for withdrawing the free end of the pole or rod and turning the sleeve in one or the other direction, substantially as set forth.

4. The combination with a pivoted pole or rod, of a sleeve swiveled thereon, said sleeve having an enlarged end and said enlarged end having notches therein, a whip-holder having ears to embrace the enlarged end of the swiveled sleeve, a bolt passing through said ears and the enlarged end of the sleeve, and ribs on said ears to enter the notches in the enlarged end of the sleeve, substantially as set forth.

5. The combination with a vehicle-tongue, of a pole or rod pivotally connected thereto, a spring for projecting the free end of said pole or rod forwardly, a sleeve axially swiveled to said pole or rod, a whip-holder attached to said sleeve, a transverse bar or loop attached to said sleeve, and a cord having a movable connection with said transverse bar or loop, substantially as set forth.

6. The combination with a vehicle-tongue, of a pole or rod pivotally connected thereto, a spring for projecting the free end of said rod forwardly, a sleeve swiveled to said pole or rod, a whip-holder attached to said sleeve, an eyebolt passing through the sleeve and rod or pole, a transverse loop or bar, said transverse loop or bar having an arm to pass through said eyebolt and another arm to pass through the sleeve in advance of the pole or rod, a ring on said transverse loop or bar adapted to move from end to end thereof and a cord attached to said ring and terminating at its other end within reach of the driver of the team, substantially as set forth.

7. The combination with a pivoted pole or bar, of a sleeve axially swiveled thereto, an eyebolt passing through the sleeve and pole or bar, a whip-socket attached to said sleeve, a spring bar or loop attached to said sleeve and to said eyebolt, and a cord attached to said spring bar or loop, substantially as set forth.

In testimony whereof I have signed this specification in the presence of two subscribing witnesses.

JOHN M. HERMAN.

Witnesses:
JOSEPH J. HERMAN,
ELFLEDA E. WRIGHT.